United States Patent
Miller et al.

(10) Patent No.: US 10,829,072 B2
(45) Date of Patent: Nov. 10, 2020

(54) DETECTION OF OCCUPANT SIZE AND POSE WITH A VEHICLE INTERIOR CAMERA

(71) Applicant: Robert Bosch GmbH, Stuttgart (DE)

(72) Inventors: James Stephen Miller, Dexter, MI (US); Patrick Graf, Southfield, MI (US)

(73) Assignee: Robert Bosch GmbH, Stuttgart (DE)

( * ) Notice: Subject to any disclaimer, the term of this patent is extended or adjusted under 35 U.S.C. 154(b) by 110 days.

(21) Appl. No.: 15/560,383

(22) PCT Filed: Apr. 8, 2016

(86) PCT No.: PCT/US2016/026747
§ 371 (c)(1),
(2) Date: Sep. 21, 2017

(87) PCT Pub. No.: WO2016/164793
PCT Pub. Date: Oct. 13, 2016

(65) Prior Publication Data
US 2018/0065582 A1    Mar. 8, 2018

Related U.S. Application Data

(60) Provisional application No. 62/145,931, filed on Apr. 10, 2015.

(51) Int. Cl.
*B60R 21/015*    (2006.01)
*G06K 9/00*    (2006.01)
(Continued)

(52) U.S. Cl.
CPC .. *B60R 21/01538* (2014.10); *B60R 21/01552* (2014.10); *G06K 9/00832* (2013.01);
(Continued)

(58) Field of Classification Search
CPC ........ B60R 21/01538; B60R 21/01552; B60R 2021/01211; B60R 2021/0032; B60R 2021/006; G06K 9/00832
See application file for complete search history.

(56) References Cited

U.S. PATENT DOCUMENTS 6,302,545 B1    10/2001    Schofield et al.
7,320,478 B2    1/2008    Gaboury et al.
(Continued)

FOREIGN PATENT DOCUMENTS

DE    10308405 A1    9/2004
DE    102008017835 A1    10/2008
(Continued)

OTHER PUBLICATIONS

Notification of Reasons for Refusal from the Japanese Patent Office for Application No. 2017-553154 dated Aug. 27, 2018 (9 pages).
(Continued)

*Primary Examiner* — Adam R Mott
(74) *Attorney, Agent, or Firm* — Michael Best & Friedrich LLP

(57) ABSTRACT

A method and system for determining a size and pose of an occupant (305, 310, 315) within a vehicle interior. In one embodiment, the method includes receiving one or more images (FIG. 3) of a vehicle interior from a camera (114). The method also includes classifying interior regions (130, 132, 134, 136, 138) of the vehicle interior (100) in the one or more images. The method also includes identifying an occupant (305, 310, 315) in the one or more images based on the classification of the interior regions (130, 132, 134, 136, 138) of the vehicle interior (100). The method also includes determining a size range of the occupant (305, 310, 315) based on the classification (404) of the interior regions of the vehicle interior (100). The method also includes determining a pose of the occupant (305, 310, 315) based on
(Continued)

the classification (404) of the interior regions of the vehicle interior (100). The method also includes controlling one or more vehicle systems (122, 124, 126, 128) based on the size and the pose of the occupant (305, 310, 315).

20 Claims, 4 Drawing Sheets

(51) Int. Cl.
  *B60R 21/00* (2006.01)
  *B60R 21/01* (2006.01)
(52) U.S. Cl.
  CPC . *B60R 2021/006* (2013.01); *B60R 2021/0032* (2013.01); *B60R 2021/01211* (2013.01)

(56) References Cited

U.S. PATENT DOCUMENTS

| | | | |
|---|---|---|---|
| 8,952,801 B2 | 2/2015 | Larice | |
| 2004/0032493 A1 | 2/2004 | Franke et al. | |
| 2004/0085448 A1 | 5/2004 | Goto et al. | |
| 2006/0041359 A1* | 2/2006 | Ohtsubo | B60N 2/0252 701/45 |
| 2006/0155442 A1 | 7/2006 | Luo et al. | |
| 2006/0280336 A1 | 12/2006 | Lee | |
| 2007/0262574 A1 | 11/2007 | Breed et al. | |
| 2008/0246318 A1* | 10/2008 | Bothe | B60N 2/0252 297/217.3 |
| 2008/0255731 A1 | 10/2008 | Mita et al. | |
| 2009/0092284 A1* | 4/2009 | Breed | B60J 10/00 382/103 |
| 2010/0274449 A1 | 10/2010 | Yonak et al. | |
| 2013/0069402 A1* | 3/2013 | Kang | B60N 2/002 297/217.2 |
| 2013/0314536 A1 | 11/2013 | Frank et al. | |
| 2015/0015706 A1 | 1/2015 | Hatori et al. | |
| 2015/0073652 A1 | 3/2015 | Bennie et al. | |
| 2018/0065582 A1 | 3/2018 | Miller et al. | |

FOREIGN PATENT DOCUMENTS

| | | |
|---|---|---|
| DE | 102011105247 A1 | 12/2011 |
| EP | 1167126 A2 | 1/2002 |
| EP | 1693256 A1 | 8/2006 |
| GB | 2384305 A | 7/2003 |
| JP | H0624286 A | 2/1994 |
| JP | 2001307077 A | 11/2001 |
| JP | 2004522932 A | 7/2004 |
| JP | 2006195571 A | 7/2006 |
| JP | 2007198929 A | 8/2007 |
| JP | 2007240475 A | 9/2007 |
| JP | 2008518195 A | 5/2008 |
| JP | 2009107527 A | 5/2009 |
| JP | 2010203836 A | 4/2020 |
| KR | 20140141285 A | 12/2014 |
| WO | 0114910 A2 | 3/2001 |
| WO | 200114910 A2 | 3/2001 |
| WO | 2002049882 A2 | 6/2002 |
| WO | 200114910 A2 | 7/2006 |

OTHER PUBLICATIONS

International Search Report and Written Opinion for Application No. PCT/US2016/026747 dated Apr. 8, 2016, (12 pages).
Notification of Reasons for Refusal from the Japanese Patent Office for Application No. 2017-553154 dated Feb. 18, 2019 (9 pages).
Notice of Preliminary Rejection from the Korean Intellectual Property Office for Application No. 10-2017-7032471 dated Nov. 14, 2018 (7 pages).
First Office Action from the National Intellectual Property Administration, P.R. China for Application No. 201680020728.8 dated Nov. 7, 2018 (14 pages).
International Preliminary Report on Patentability for Application No. PCT/US2016/026747 dated Oct. 19, 2017 (7 pages).
Notice of Preliminary Rejection from the Korean Intellectual Property Office for Application No. 10-2017-7032471 dated May 20, 2019 (6 pages).
Notice of Reasons for Refusal from the Japanese Patent Office for Application No. 2017-553154 dated Oct. 29, 2019 (8 pages).
Decision of Rejection from the National Intellectual Property Administration, P.R. China for Application No. 201680020728.8 dated Dec. 5, 2019 (12 pages).
Notification of Reasons for Refusal from the Japanese Patent Office for Application No. 2017-553154 dated Apr. 21, 2020 (5 pages).
Notice of Final Rejection from the Korean Intellectual Property Office for Application No. 10-2017-7032471 dated Jan. 29, 2020 (3 pages).

* cited by examiner

DETECTION OF OCCUPANT SIZE AND POSE WITH A VEHICLE INTERIOR CAMERA

CROSS-REFERENCE TO RELATED CASES

This application claims the benefit of U.S. Provisional Patent Application No. 62/145,931 filed on Apr. 10, 2015, the entire contents of which are incorporated herein by reference.

BACKGROUND

Current occupant detection systems detect the locations of occupants in a vehicle using seat-based sensors to detect the weight of an occupant or other object in the seat. Other occupant detection systems detect the locations of occupants using cameras. Location information can be used, for example, to enable or disable an airbag for that seat.

SUMMARY

Current occupant detection systems are able to provide general occupant location information. In some cases, more specific occupant location information and additional information regarding an occupant are desirable. For example, airbags could be better controlled with additional information about the size and the pose of the occupants in the vehicle relative to the one or more airbags. Similarly, other vehicle safety systems may be better controlled with additional information about the size and the pose of the occupants in the vehicle relative to the other vehicle safety systems. Thus, there is a need for a system and a method to determining the size and the pose of the occupants of a vehicle.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method of determining a size and pose of an occupant within a vehicle interior. The method includes receiving, with an electronic control unit, one or more images of a vehicle interior from a camera. The method also includes classifying, with the electronic control unit, interior regions of the vehicle interior in the one or more images. The method also includes identifying, with the electronic control unit, an occupant in the one or more images based on the classification of the interior regions of the vehicle interior. The method also includes determining, with the electronic control unit, a size range of the occupant based on the classification of the interior regions of the vehicle interior. The method also includes determining, with the electronic control unit, a pose of the occupant based on the classification of the interior regions of the vehicle interior. The method also includes controlling one or more vehicle systems based on the size and the pose of the occupant.

In another embodiment, a system for determining a size and pose of an occupant within a vehicle interior. The system includes a camera and an electronic control unit. The camera is configured to capture one or more images of a vehicle interior. The electronic control unit has memory and an electronic processor electrically coupled to the memory. The electronic control unit is configured to receive the one or more images from the camera, classify interior regions of the vehicle interior in the one or more images, identify an occupant in the one or more images based on the classification of the interior regions of the vehicle interior, determine a size range of the occupant based on the classification of the interior regions of the vehicle interior, determine a pose of the occupant based on the classification of the interior regions of the vehicle interior, and control one or more vehicle systems based on the size and the pose of the occupant.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, based on a reading of this detailed description, would recognize that, in at least one embodiment, the electronic based aspects of the invention may be implemented in software (for example, stored on non-transitory computer-readable medium) executable with one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (for example, a system bus) connecting the components.

Figure 1:
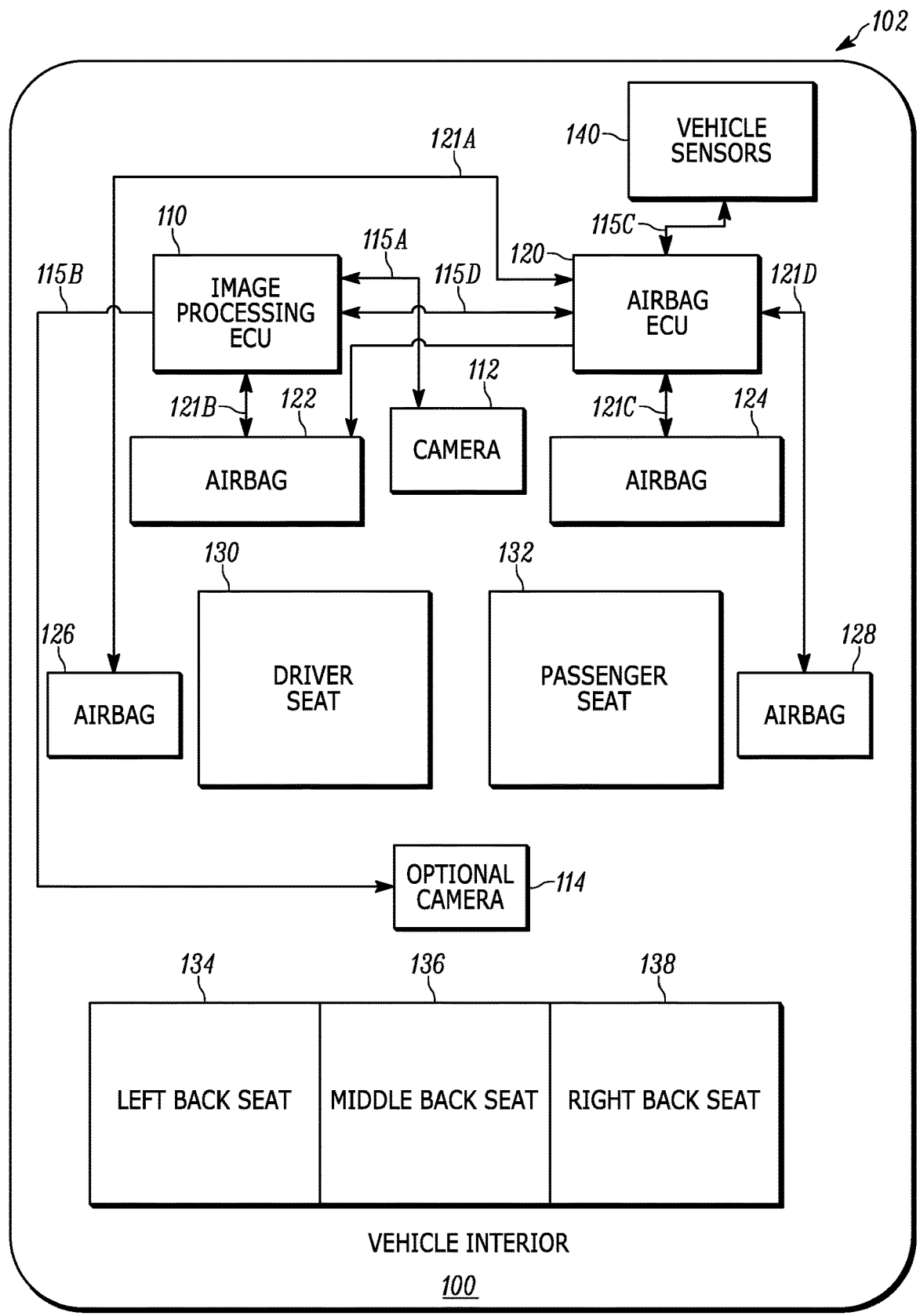
FIG. 1 is a block diagram of a vehicle interior equipped with occupant size and pose detection system.

FIG. 1 is a block diagram that illustrates a vehicle interior 100 equipped with an occupant size and pose detection system 102 according to one embodiment. The occupant size and pose detection system 102 includes an image processing electronic control unit (ECU) 110, an camera 112 (for example, a fisheye lens camera), an optional camera 114, communication interfaces 115A-115D (collectively "communication interfaces 115"), an airbag control unit (ACU) 120, electrical links 121A-121D (collectively "electrical links 121") (for example, wires), airbags 122-128, driver seat 130, passenger seat 132, left back seat 134, middle back seat 136, right back seat 138, and vehicle sensors 140.

The camera 112 is communicatively coupled to the image processing ECU 110 via the communication interface 115A. Additionally, in some embodiments, the optional camera 114 is communicatively coupled to the image processing ECU 110 via the communication interface 115B. The image processing ECU 110 accesses a plurality of images (for example, omnidirectional images) captured with the camera 112. The image processing ECU 110 processes the plurality of images at predetermined intervals of time and records the plurality of images and associated data. For example, the image processing ECU 110 may process the plurality of images based, at least in part, on a distance travelled by the vehicle interior 100. The communication interfaces 115 also communicatively couple the image processing ECU 110 with the ACU along with other vehicle systems (for example, the vehicle sensors 140 and the vehicle control devices 145 as described below).

Some embodiments of the size and pose detection system 102 also include one or more vehicle sensors 140 that indicate position and movement of the vehicle interior 100. For example, the vehicle sensors 140 may include a steering angle sensor, a wheel position or wheel speed sensor, and a global positioning system (GPS). The vehicle sensors 140 enable the ACU 120 to be able to detect position, heading, and motion of the vehicle interior 100 based on movement information provided by the vehicle sensors 140. In addition, the ACU 120 is configured to calculate the position and a change of position over time based on the movement information. In addition, the ACU 120 may be communicatively coupled to one or more vehicle control devices (for example, a steering wheel, a throttle, or a braking system). Using information provided the one or more vehicle sensors 140 and/or the vehicle control devices, the ACU 120 may perform airbag operations based on the position of the vehicle interior 100 and the size and pose of the occupants within the vehicle interior 100 that are analyzed by the size and pose detection system 102.

Figure 2:
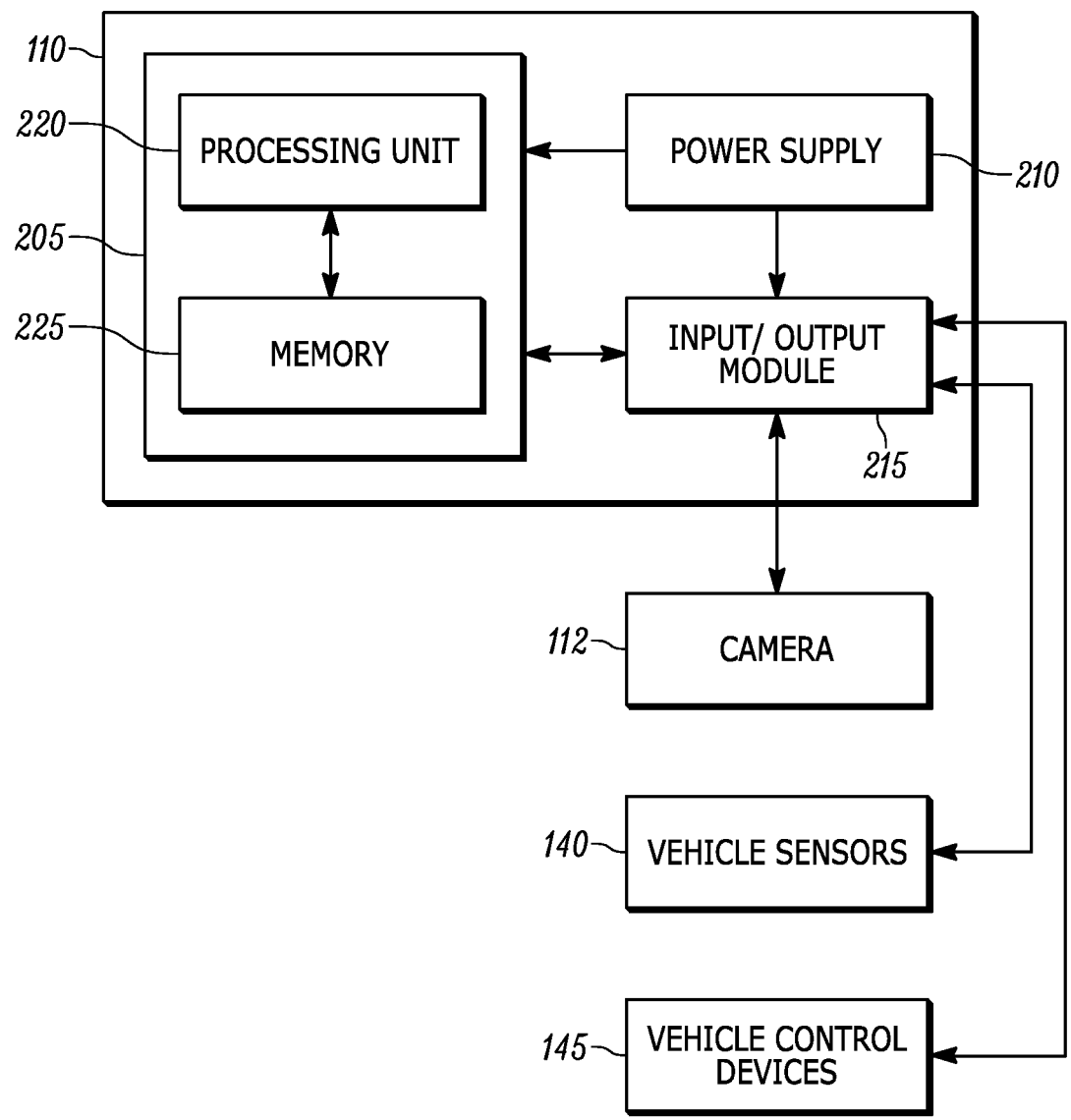
FIG. 2 is a block diagram of an electronic control unit of the occupant size and pose detection system of FIG. 1.

FIG. 2 is a block diagram of the image processing ECU 110 of the occupant size and pose detection system 102 of FIG. 1. The image processing ECU 110 includes a plurality of electrical and electronic components that provide power, operation control, and protection to the components and modules within the image processing 110 and/or the camera 112. For example, the image processing ECU 110 includes, among other things, a controller 205 (such as a programmable electronic microprocessor, microcontroller, or other suitable processing device), a power supply 210, and an input/output module 215.

The controller 205 includes, among other things, an electronic processor 220 and a memory 225. The electronic processor 220 is communicatively coupled to the memory 225 and executes instructions which are capable of being stored in the memory 225. The controller 205 is configured to retrieve from memory 225 and execute, among other things, instructions related to the control processes and method described herein. In other embodiments, the image processing ECU 110 includes additional, fewer, or different components. It should be noted that the image processing ECU 110 may be implemented in several independent electronic control units each configured to perform specific functions listed herein. Additionally, the image processing ECU 110 may contain sub-modules that input specific types of sensor data and perform related processes. For example, a video analysis module of the image processing ECU 110 may receive a video stream or one or more images from the camera 112, transform the video or one or more images into a suitable format, recognize objects and features (for example, occupants in a vehicle, pose of the occupants, and size range of the occupants) in the one or more images, track the objects and features within the one or more images, and control other ECUs, or send data outputs from these processes to other ECUs (for example, the ACU 120).

The image processing ECU 110, among other things, is configured to receive one or more images from the camera 112 and process the one or more images. For example, in the embodiment of FIG. 2, the input/output module 215 receives the one or more images from the camera 112 and sends the one or more images to the controller 205 for image processing. The controller 205 then processes the one or more images.

The image processing ECU 110, the sub-modules, the additional ECUs (for example, the ACU 12), the vehicle sensors 140, and the vehicle control devices 145 may be linked through one or more communication modules on the communication interface 115C and/or directly connected via the input/output module 215. In some embodiments, the ACU 120 communicates by means of a protocol such as J1939 or CAN bus for communicating with the input/output module 215. In other embodiments, the ACU 120 communicates with the input/output module 215 under other suitable protocols depending on the needs of the specific application. In some embodiments, the input/output module 215 inputs information directly using dedicated signal lines from the various controls and sensors.

Figure 3:
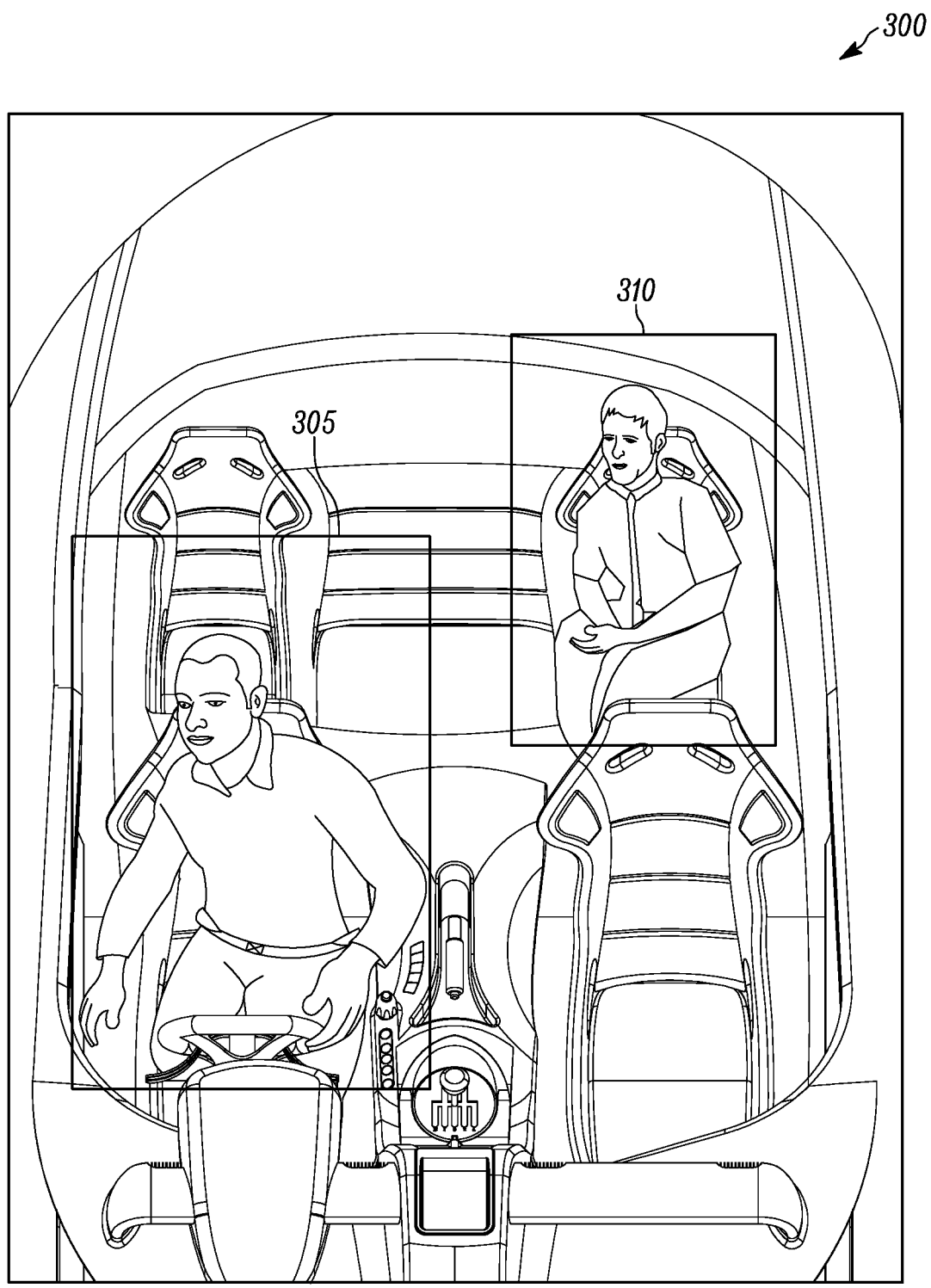
FIG. 3 is an image from a camera with a wide angle lens that covers a significant portion of the vehicle interior 100.

For example, FIG. 3 is an image 300 from the camera 112 with a wide angle lens that covers a significant portion of the vehicle interior 100. In this illustrated embodiment, the image 300 includes two occupants, a first occupant 305 and a second occupant. The two occupants are objects of interest for the image processing ECU 110. As illustrated in FIG. 3, the first occupant 305 and the second occupant 310 occupy positions (for example, the driver seat 130 and the left back seat 134, respectively) in the image 300 from the camera 112 and are detected by the image processing ECU 110 as a pixel position or as a set of coordinates (for example, a vertical coordinate and a horizontal coordinate).

In some embodiments, the image processing ECU 110 uses a classifier approach to extract information (for example, the position, size, and pose of vehicle occupants) from the image 300 from the camera 112. For example, the classifier is based on image features including edges, shapes, colors, and other suitable features. Additionally, one or more classifiers may be used to detect the full extent of the occupant visible in the image (typically the head and torso region). Different classifiers may be trained for different seat locations in the vehicle interior 100. In this way, the classifiers may be used to identify the location of occupants in the vehicle interior 100 including the first occupant 305 and the second occupant 310.

In some embodiments, additional classifiers may also be used to detect separate parts of occupants including the head, shoulders, torso, arms or other suitable features of the occupant. These additional classifiers may be combined to estimate the pose of each of the occupants in the vehicle interior 100. Similarly, multiple classifiers may be used to detect different poses of each occupant in the vehicle interior 100. For example, the first occupant 305 may be sitting upright and the second occupant 310 may be leaning forward in the vehicle interior 100.

In some embodiments, the image processing ECU 110 uses the size of the occupant in pixels from the classifier to estimate the size of the occupant. Additionally, the image processing ECU 110 may use a camera calibration or the pose of the occupant (for example, the location and orientation of head of the occupant). The image processing ECU 110 is capable of communicating information indicating the location, size, and pose of the occupant to other vehicle systems including the ACU 120 and the vehicle control devices 145. The ACU 120 and/or the vehicle control devices 145 may alter their functions based on the information indicating the location, size, and pose of the occupant. For example, the ACU 120 may use the information to determine which airbag or airbags (for example, one or more of airbags 122-128 as illustrated in FIG. 1) to deploy in the event of a collision. Additionally, the ACU 120 may use the information to determine deployment characteristics (for example, the strength of the deployment, the angle of deployment, or other suitable characteristics) of the airbag or airbags that are deployed in the event of the collision. Similarly, the image processing ECU 110 may provide the information to the vehicle control devices 145, such as the seatbelt system. The seatbelt system may use the information to control the function of the seatbelts in the vehicle interior 100 in the event of an accident. In some embodiments, the seatbelt system may control the function of the seatbelts to coordinate with the deployment of the airbag or airbags by the ACU 120.

In other embodiments, the image processing ECU 110 may provide the information indicative of the location, size, and pose of the occupants of a vehicle for applications related to safety, security, comfort and convenience. For example, the information may be used to set warnings if a driver or passenger does not have their seat belt engaged, or if the seatbelt is not engaged properly (for example, the seatbelt is not properly restraining the driver or passenger). In yet other embodiments, the image processing ECU 110 provides the information to vehicle systems that automatically set the positions of the driver seat 130, the pedals, the steering wheel, and/or the vehicle mirrors based on the size and shape of the occupant in the driver seat 130. Similarly, the image processing ECU 110 provides the information to vehicle systems that automatically set the positions of the passenger seat 132 based on the size and shape of the occupant in the passenger seat 132.

Figure 4:
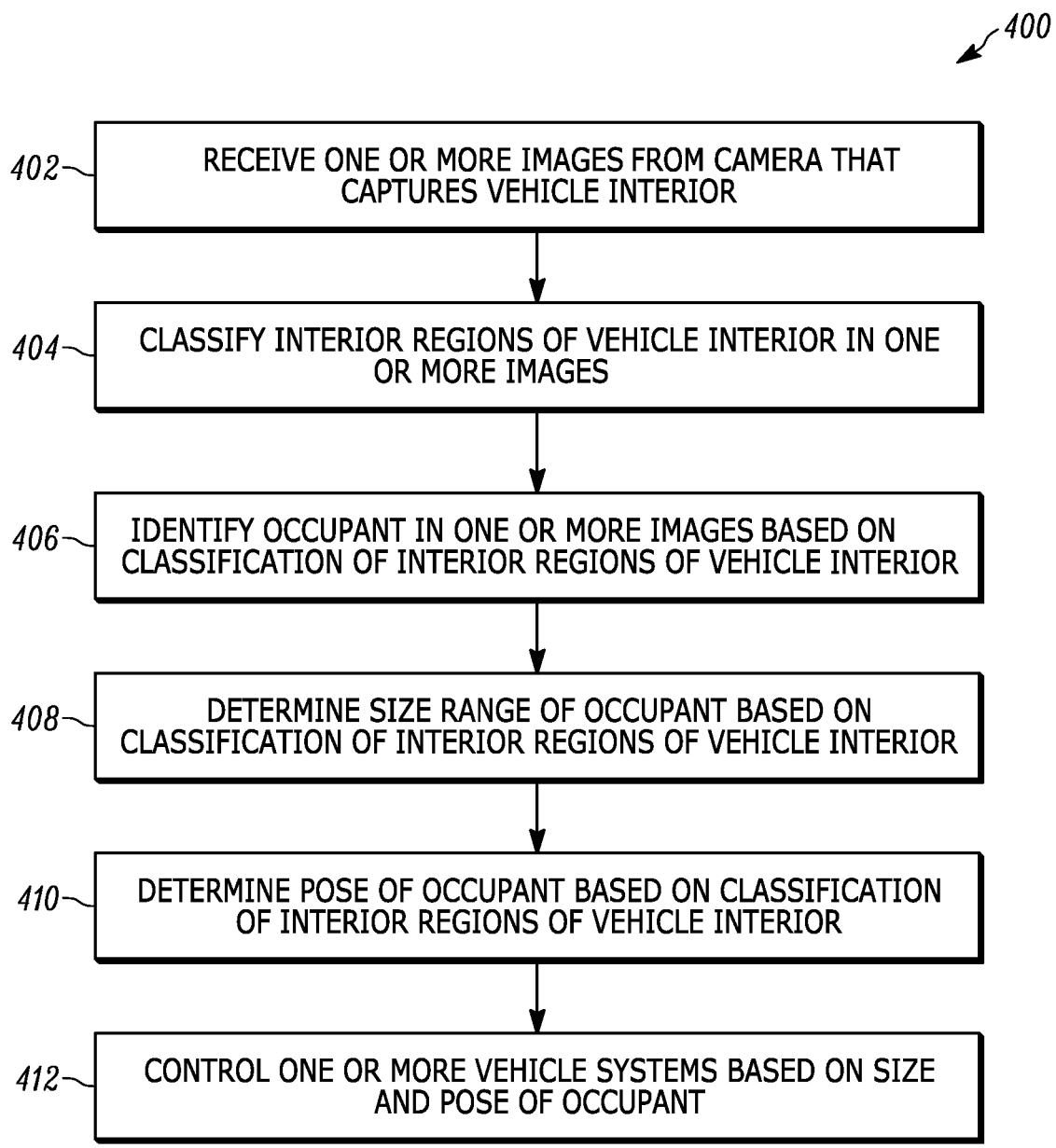
FIG. 4 is a flowchart of a method of determining a size and a pose of an occupant using the occupant size and pose detection system of FIG. 1.

FIG. 4 is a flowchart of the method 400 of determining a size and a pose of an occupant within a vehicle interior using the size and pose detection system 102. The method 400 is described as being performed with the image processing ECU 110. However, it should be understood that the functionality illustrated in the method 400 may be distributed among multiple devices, such as between the image processing ECU 110, the ACU 120, and/or the other vehicle control devices.

As illustrated in FIG. 4, an image processing ECU 110 receives one or more images from the camera 112 that captures a vehicle interior (at block 402). For example, the image processing ECU 110 receives a video stream from the camera 112 with wide angle lens to cover all seating areas in vehicle interior 100. Additionally, in some embodiments, the image processing ECU 110 receives one or more images from the optional camera 114 that captures the vehicle interior from a different location than the location of the camera 112. For example, the optional camera 114 may capture images of seating locations, such as a third row of seats in a longer vehicle interior 100.

The image processing ECU 110 classifies interior regions of the vehicle interior in one or more images (at block 404). In some embodiments, the one or more images may be pre-processed to improve overall image quality, capture statistics for controlling camera values such as exposure, and potentially resample the image to obtain a desired resolution for further processing. The one or more images are processed to extract image features such as lines, shapes, gradient magnitudes and directions, texture, and color for all the pixels or small grouping of pixels in the one or more images. These extracted image features are fed into a classifier (for example, a comparator) which correlates the extracted features in a region of the image (for example, an interior region of the vehicle interior) to determine how well the extracted image features match the features of a class of objects (for example, vehicle occupants, seats, seatbelts, or other vehicle interior object classes). The classifier is based on previously collected data of the class of object to be detected. The previously collected data of the class of object may include a large group of images of occupants in a vehicle. These occupants in the large group of images need to represent a diverse set of sizes, ages, seating poses, clothing, and taken with a range of lighting conditions. In some embodiments, there are different classifiers corresponding to different seats in the vehicle (for example, front seats vs rear seats, or each individual seat). Additionally, in some embodiments, there is a separate classifier for detecting infant carriers.

The image processing ECU 110 may use a classification of the interior regions of the vehicle interior to identify an occupant in the one or more images (at block 406). For example, the image processing ECU 110 may use the classification of interior regions of the vehicle interior by an initial classifier as a score for each interior region in the one or more images. The score is compared to a threshold value stored in the memory of the image processing ECU 110 to identify an occupant in the one or more images. In some embodiments, to increase the likelihood that the occupant is identified in the one or more images and limit false detections, the image processing ECU 110 may use a low threshold value stored in the memory of the image processing ECU 110 and also requirement that the identification occur in the same interior region of the vehicle interior in two or more images.

After the image processing ECU 110 identifies an occupant in an interior region of the one or more images, the image processing ECU 110 determines a size range of the occupant based on the classification of the interior regions as described above (at block 408). In other embodiments, for interior regions of the one or more images with an occupant, additional processing may be performed to determine the size range of the occupant. For example, the image processing ECU 110 may use classifiers specific to detecting heads, torsos, arms and legs to classify the occupant and then combine the classifications to determine the size range of the occupant. In some embodiments, camera calibration values may also be used to take the detected size and identified location of the occupant in the one or more images and convert the detected size and identified location into an estimate of the size of the occupant. In some embodiments, identifying the occupant in the one or more images based on the classification of the interior regions of the vehicle interior includes, the image processing ECU 110 determining whether the occupant is located in a driver seat of the vehicle interior. Additionally, it is understood that the size range of the occupant correlates to a shape of the occupant. In other words, it is understood that the image processing ECU 110 can determine the shape of the occupant after determining the size range of the occupant.

After the image processing ECU 110 identifies an occupant in an interior region of the one or more images, the image processing ECU 110 also determines a pose of the occupant based on the classification of the interior regions as described above (at block 410). In other embodiments, for interior regions of the one or more images with an occupant, additional processing may be performed to determine the pose of the occupant. For example, the image processing ECU 110 may use classifiers specific to detecting heads, torsos, arms and legs to classify the occupant and then combine the classifications to determine the pose of the occupant.

After the image processing ECU 110 determines the size range and the pose of the occupant, in some embodiments, the image processing ECU 110 controls other vehicle systems based on the occupant size and pose (at block 412). By controlling the other vehicle systems using information regarding the occupant size and pose, the image processing ECU 110 increases the safety of the occupant within the vehicle. Alternatively, after the image processing ECU 110 determines the size range and the pose of the occupant, the image processing ECU 110 may transmit the occupant size and pose to other vehicle systems (for example, the ACU 120) to allow the other vehicle systems to increase accuracy in controlling the airbags, seatbelts, and other safety mechanisms of the vehicle. For example, the image processing ECU 110 may transmit the size and pose of the occupant to the ACU 120 as described above, and the ACU 120 may activate one or more airbags for deployment based at least in part on the size and the pose of the occupant increasing the safety of the occupant.

In some embodiments, the image processing ECU 110 or the ACU 120 may also determine one or more deployment characteristics of the one or more airbags based on the size and the pose of the occupant. The deployment characteristics of the one or more airbags may include at least one a strength of deployment of the one or more airbags or an angle of deployment of the one or more airbags.

In some embodiments, the image processing ECU 110 may also transmit the size and the pose of the occupant to a seatbelt system. The seatbelt system may determine whether the occupant has properly engaged a seatbelt based at least in part on the size and the pose of the occupant.

It is understood that FIG. 4 has been described as classifying, identifying, and determining a size and pose of an occupant within a vehicle. However, it is also understood that the method 400 as described and illustrated in FIG. 4 may be used to classify, identify, and determine the size and the pose of a plurality of occupants within a vehicle. For example, in some embodiments, the image processing ECU 110 may identify a second occupant in the one or more images based on the classification of the interior regions of the vehicle interior. The image processing ECU 110 may also determine a size range of the second occupant based on the classification of the interior regions of the vehicle interior. The image processing ECU 110 may also determine a pose of the second occupant based on the classification of the interior regions of the vehicle interior. After determining the size and the pose of the second occupant, the image processing ECU 110 may control one or more vehicle systems based on the size and the pose of the second occupant. Alternatively, after determining the size and the pose of the second occupant, the image processing ECU 110 may transmit the size and the pose of the second occupant to one or more vehicle systems.

Thus, the invention provides, among other things, a method and a system for determining size and pose of an occupant within a vehicle. Various features and advantages of the invention are set forth in the following claims.

What is claimed is:

1. A method of determining a size and pose of one or more occupants within a vehicle interior, the method comprising:
receiving, with an electronic control unit, one or more images of a vehicle interior from a camera that has a field-of-view of a portion of a front vehicle region of the vehicle interior and a portion of a rear vehicle region of the vehicle interior;
classifying, with the electronic control unit, the portion of the front vehicle region in the one or more images with a first classifier;
classifying, with the electronic control unit, the portion of the rear vehicle region in the one or more images with a second classifier that is different from the first classifier;
identifying, with the electronic control unit, a first occupant in the front vehicle region from a second occupant in the rear vehicle region based on the classification of the front vehicle region with the first classifier and the classification of the rear vehicle region with the second classifier;
determining, with the electronic control unit, a size of the first occupant based on the classification of the front vehicle region with the first classifier;
determining, with the electronic control unit, a pose of the first occupant based on the classification of the front vehicle region with the first classifier; and
controlling one or more vehicle systems based on the size and the pose of the first occupant.

2. The method of claim 1, wherein identifying the first occupant in the front vehicle region from the second occupant in the rear vehicle region based on the classification of the portion of the front vehicle region with the first classifier and the classification of the portion of the rear vehicle region with the second classifier includes determining, with the electronic control unit, whether the first occupant is located in a driver seat of the vehicle interior.

3. The method of claim 1, wherein controlling the one or more vehicle systems based on the size and the pose of the first occupant includes
transmitting, with the electronic control unit, the size and the pose of the first occupant to an airbag control unit; and
activating, with the airbag control unit, one or more airbags for deployment based at least in part on the size and the pose of the first occupant.

4. The method of claim 3, further comprising determining, with the airbag control unit, one or more deployment characteristics of the one or more airbags based on the size and the pose of the first occupant.

5. The method of claim 4, wherein the one or more deployment characteristics of the one or more airbags include at least one a strength of deployment or an angle of deployment.

6. The method of claim 1, wherein controlling the one or more vehicle systems based on the size and the pose of the first occupant includes
transmitting, with the electronic control unit, the size and the pose of the first occupant to a seatbelt system; and
determining, with the seatbelt system, whether the first occupant has properly engaged a seatbelt based at least in part on the size and the pose of the first occupant.

7. The method of claim 1, further comprising:
determining, with the electronic control unit, a size of the second occupant based on the classification of the portion of the rear vehicle region with the second classifier;
determining, with the electronic control unit, a pose of the second occupant based on the classification of the portion of the rear vehicle region with the second classifier; and
controlling a second one or more vehicle systems based on the size and the pose of the second occupant.

8. The method of claim 1, further comprising:
classifying, with the electronic control unit, the portion of the front vehicle region in the one or more images with a third classifier that is different from the first classifier and the second classifier; and
classifying, with the electronic control unit, the portion of the rear vehicle region in the one or more images with the third classifier, wherein the third classifier detects an infant carrier.

9. The method of claim 1, further comprising determining, with the electronic control unit, a position for a vehicle seat based on the size and pose of the first occupant.

10. The method of claim 9, further comprising determining, with the electronic control unit, a position for one or more vehicle pedals based on the position of the vehicle seat.

11. The method of claim 10, further comprising determining, with the electronic control unit, a position for one or more vehicle mirrors based on the position of the vehicle seat.

12. The method of claim 11, further comprising determining, with the electronic control unit, a position for a vehicle steering wheel based on the position of the vehicle seat.

13. The method of claim 1, wherein the camera is positioned in the front vehicle region.

14. A system for determining a size and pose of one or more occupants within a vehicle interior, the system comprising:
a camera configured to capture one or more images of a vehicle interior, the camera having a field-of-view of a portion of a front vehicle region of the vehicle interior and a portion of a rear vehicle region of the vehicle interior; and
an electronic control unit having memory and an electronic processor electrically coupled to the memory, wherein the electronic control unit is configured to
receive the one or more images from the camera,
classify the portion of the front vehicle region in the one or more images with a first classifier,
classify the portion of the rear vehicle region in the one or more images with a second classifier that is different from the first classifier,
identify a first occupant in the front vehicle region from a second occupant in the rear vehicle region based on the classification of the front vehicle region with the first classifier and the classification of the rear vehicle region with the second classifier,
determine a size of the first occupant based on the classification of the front vehicle region with the first classifier,
determine a pose of the first occupant based on the classification of the front vehicle region with the first classifier, and
control one or more vehicle systems based on the size and the pose of the first occupant.

15. The system of claim 14, wherein, to identify the first occupant in the front vehicle region from the second occupant in the rear vehicle region based on the classification of the portion of the front vehicle region with the first classifier and the classification of the portion of the rear vehicle region with the second classifier, the electronic processor is further configured to determine whether the first occupant is located in a driver seat of the vehicle interior.

16. The system of claim 14, further comprising an airbag control unit, wherein, to control the one or more vehicle systems based on the size and the pose of the first occupant, the electronic processor is further configured to transmit the size and the pose of the first occupant to the airbag control unit, and wherein the airbag control unit is configured to activate one or more airbags for deployment based at least in part on the size and the pose of the first occupant.

17. The system of claim 16, wherein the airbag control unit is further configured to determine one or more deployment characteristics of the one or more airbags based on the size and the pose of the first occupant.

18. The system of claim 17, wherein the one or more deployment characteristics of the one or more airbags include at least one a strength of deployment or an angle of deployment.

19. The system of claim 14, further comprising a seatbelt system, wherein, to control the one or more vehicle systems based on the size and the pose of the first occupant, the electronic processor is further configured to transmit the size and the pose of the first occupant to the seatbelt system, and wherein the seatbelt system is configured to determine whether the first occupant has properly engaged a seatbelt based at least in part on the size and the pose of the first occupant.

20. The system of claim 14, wherein the electronic processor is further configured to
determine a size of the second occupant based on the classification of the portion of the rear vehicle region with the second classifier,
determining a pose of the second occupant based on the classification of the portion of the rear vehicle region with the second classifier, and
control a second one or more vehicle systems based on the size and the pose of the second occupant.

* * * * *